US006022442A

United States Patent [19]

Seidl

[11] Patent Number: 6,022,442

[45] Date of Patent: Feb. 8, 2000

[54] METHOD FOR MAKING A CARD PRODUCT

[75] Inventor: Joachim Seidl, Edling, Germany

[73] Assignee: MTL Modern Technologies Lizenz GmbH, Germany

[21] Appl. No.: 08/903,521

[22] Filed: Jul. 30, 1997

[51] Int. Cl.$^7$ .......... B32B 31/00

[52] U.S. Cl. .......... 156/256; 156/293; 156/298; 156/513; 156/517; 83/343; 83/346; 83/405; 83/505; 493/370; 493/471; 283/70; 283/75; 283/101

[58] Field of Search .......... 156/265, 256, 156/251, 513, 518, 293, 298, 530, 258, 261, 517; 83/346, 347, 348, 343, 344, 505, 506, 405, 509; 493/370, 471; 283/70, 75, 101

[56] References Cited

U.S. PATENT DOCUMENTS

| | | | |
|---|---|---|---|
| 254,945 | 3/1882 | Fest | 156/154 |
| 5,403,236 | 4/1995 | Greig | 462/6 |

*Primary Examiner*—Richard Crispino
*Assistant Examiner*—Linda L. Gray
*Attorney, Agent, or Firm*—Reising, Ethington, Barnes, Kisselle, Learman & McCulloch, P.C.

[57] ABSTRACT

Method and apparatus for producing a card product including a sheet with at least one cut-out and a card which is disposed in the cut-out of the sheet, wherein the sheet and the card are held together by at least one adhesive strip which is coated on one side with contact adhesive. The method has the following method steps:

a) a first material web for producing the sheet and a second material web for producing the card are delivered, lying one above the other, to a die cutting arrangement;

b) the first and second material webs are simultaneously cut, a segment corresponding to the size of the cut-out being cut out of the first material web and the card being cut out of the second material web, c) the segment of the first material web is removed, whilst the card of the second material web is inserted into the resulting cut-out, d) the card and first material web are fixed in position relative to one another by application of the adhesive strip, and the application of the adhesive strip already begins before the card or segment is completely cut out.

The card product produced by this method is distinguished in that the card has a width and length which correspond exactly to the width and length of the cut-out.

3 Claims, 3 Drawing Sheets

METHOD FOR MAKING A CARD PRODUCT

BACKGROUND OF THE INVENTION

1. Field of the Invention

The requirement for thin plastic cards, so-called ID cards, is constantly increasing. Whilst major portions of these cards can be pre-printed with non-variable data, it is frequently desirable and economical to apply the variable data, such as name, expiration date etc., at a later stage with the aid of a printer, in which case it should preferably be possible to print on both sides of the card.

However, most printers are not capable of printing documents of the size of the usual ID card, which measures 2⅛x3⅜ inches. Therefore such cards are usually first of all fixed on a sheet of paper or a material web in continuous form before they are delivered to a printer for application of the variable data.

If the cards are applied directly to a carrier sheet with a contact adhesive, this means that only one side of the card can be printed at a later stage. Furthermore, as a result an overall thickness of the product is soon reached which is no longer accepted by all printers.

2. Description of Related Art

U.S. Pat. No. 5,403,236 discloses a card product in which these disadvantages are avoided by providing a cut-out into which the card is inserted in a first sheet, the connection of sheet and card being made for example by two adhesive strips on the reverse side of the card. In this case these adhesive strips only cover a small portion of the card.

In the production of this known card product the cut-out is first of all produced in the first sheet. Then the adhesive strips provided with contact adhesive are applied to this sheet in such a way that they overlap the cut-out with a part of their surface. Finally, in a last operation the card is inserted into this cut-out, so that it comes into contact with the overlapping part of the adhesive strips and is thereby secured in the cut-out.

When the card is inserted it must be aligned exactly with the cut-out. Such alignment is, however, always subject to deviations within a certain range of tolerance. Therefore, with this method it is imperative that the card has a length and width which is somewhat smaller then the length and width of the cut-out. Experience shows that in this case a difference in the length and width of approximately 50/1000 of an inch (1.27 mm) is necessary in order to compensate for deviations due to the insertion process.

Accordingly the card product produced using this method has gaps between the card and the sheet material surrounding the card which can vary between 25/1000 of an inch (0.635 mm) and 50/1000 of an inch (1.27 mm). Apart from an unpleasant aesthetic overall impression, such a card product can no longer be printed by offset or flexographic printing methods if the impression is also to be made in the junction region between card and sheet material, since the printing ink would collect in the gaps between card and sheet material and on the impression cylinder of the printing press. This in turn leads to unwanted inking on the card product and, in certain circumstances, to damage to the printing plate or the platen cylinder.

BRIEF SUMMARY OF THE INVENTION

In order to keep the gaps between card and surrounding sheet material as small as possible, extremely precise and thus very costly equipment is necessary.

The object of the invention, therefore, is to produce a card product in which the disadvantages of the prior art can be avoided.

This object is achieved in that the card product is produced by the following method steps:

a) a first material web for producing the sheet and a second material web for producing the card are delivered, lying one above the other, to a die cutting arrangement, b) the first and second material webs are simultaneously cut, a segment corresponding to the size of the cut-out being cut out of the first material web and the card being cut out of the second material web, c) the segment of the first material web is removed, whilst the card of the second material web is inserted into the resulting cut-out, d) the card and first material web are fixed in position relative to one another by application of the adhesive strip, and the application of the adhesive strip already begins before the card or segment is completely cut out.

The apparatus necessary for this comprises a) a die cutting arrangement for simultaneous cutting of the first and second material webs, b) an arrangement for removing the cut-out segment of the first material web, c) an arrangement for introducing the card into the cut-out, d) means for temporarily fixing the first material web and the card in position relative to one another—before complete cutting out, e) means for applying the adhesive strip.

By this method or this apparatus a card product can be produced comprising a) a sheet which is produced from a first material web and has at least one cut-out which has a specific width and length, b) a card which is produced from a second material web and is disposed in the cut-out of the sheet, wherein the sheet and the card are held together by at least one adhesive strip coated on one side with a contact adhesive and wherein the card has a width and length which correspond exactly to the width and length of the cut-out.

Further advantages and embodiments of the invention are the subject matter of the subordinate claims and are explained in greater detail below with reference to an example and to the drawings.

DETAILED DESCRIPTION OF THE INVENTION

Figure 1:
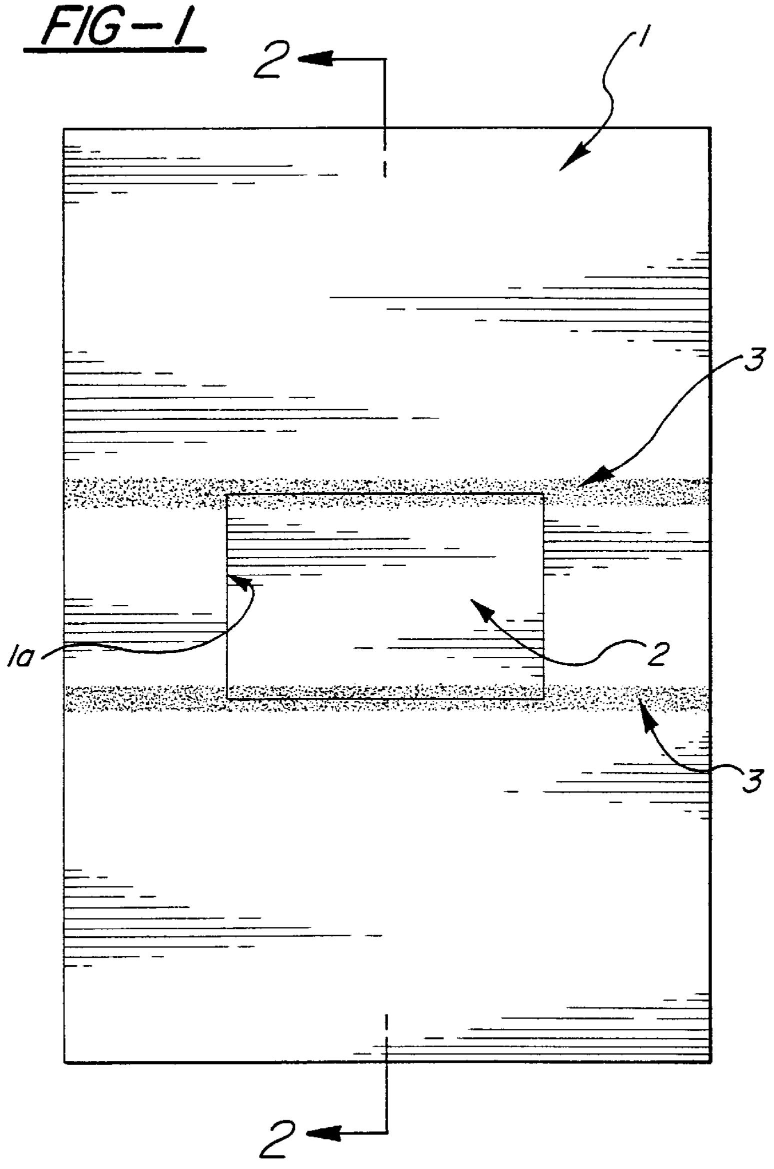
FIG. 1 shows a top view of a card product.
Figure 2:
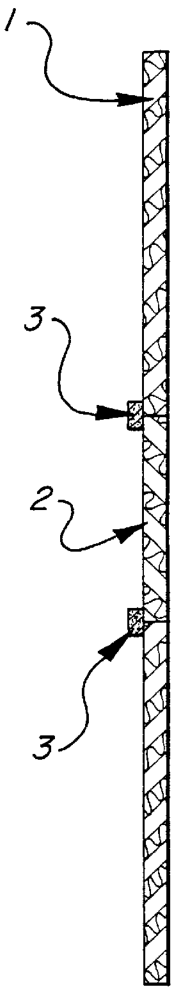
FIG. 2 shows a sectional representation along the line II—II in FIG. 1.

The card product illustrated in FIGS. 1 and 2 essentially comprises a sheet 1 which is produced from a first material web and has at least one cut-out 1*a* which has a specific width and length, and a card 2 which is produced from a second material web and is disposed in the cut-out 1*a* of the sheet 1.

The card 2 has a width and length which correspond exactly to the width and length of the cut-out 1*a*. The sheet 1 and the card 2 are held together by at least one adhesive strip 3 coated on one side with a contact adhesive.

In the illustrated embodiment the sheet 1 and the card 2 have essentially the same thickness. The sheet 1 can be produced for example from paper or cardboard and the card 2 can be produced from paper, cardboard or plastics material. In the illustrated embodiment two adhesive strips disposed parallel to one another are provided for holding the sheet 1 and card 2 together, and these adhesive strips are disposed as required on the front and/or reverse side of the card product in such a way that they partially overlap the cut-out 1*a* and with this overlapping part they secure the card 2.

In order to enable to the card in the card product to be printed on both sides, the area of the card which is not covered by the adhesive strip 3 is greater by a multiple than the area covered by the adhesive strip. The card product is distinguished in particular by the the fact that the card 2 is produced with exactly the same length and width as the cut-out 1*a*, so that the card 2 can be disposed with an exact fit in the cut-out 1*a*. As a result there are no gaps in the junction region of the sheet 1 and the card 2 in which printing ink could collect. This card product can also be printed in the junction region between the sheet and the card, for example using offset or flexographic printing methods.

Figure 3:
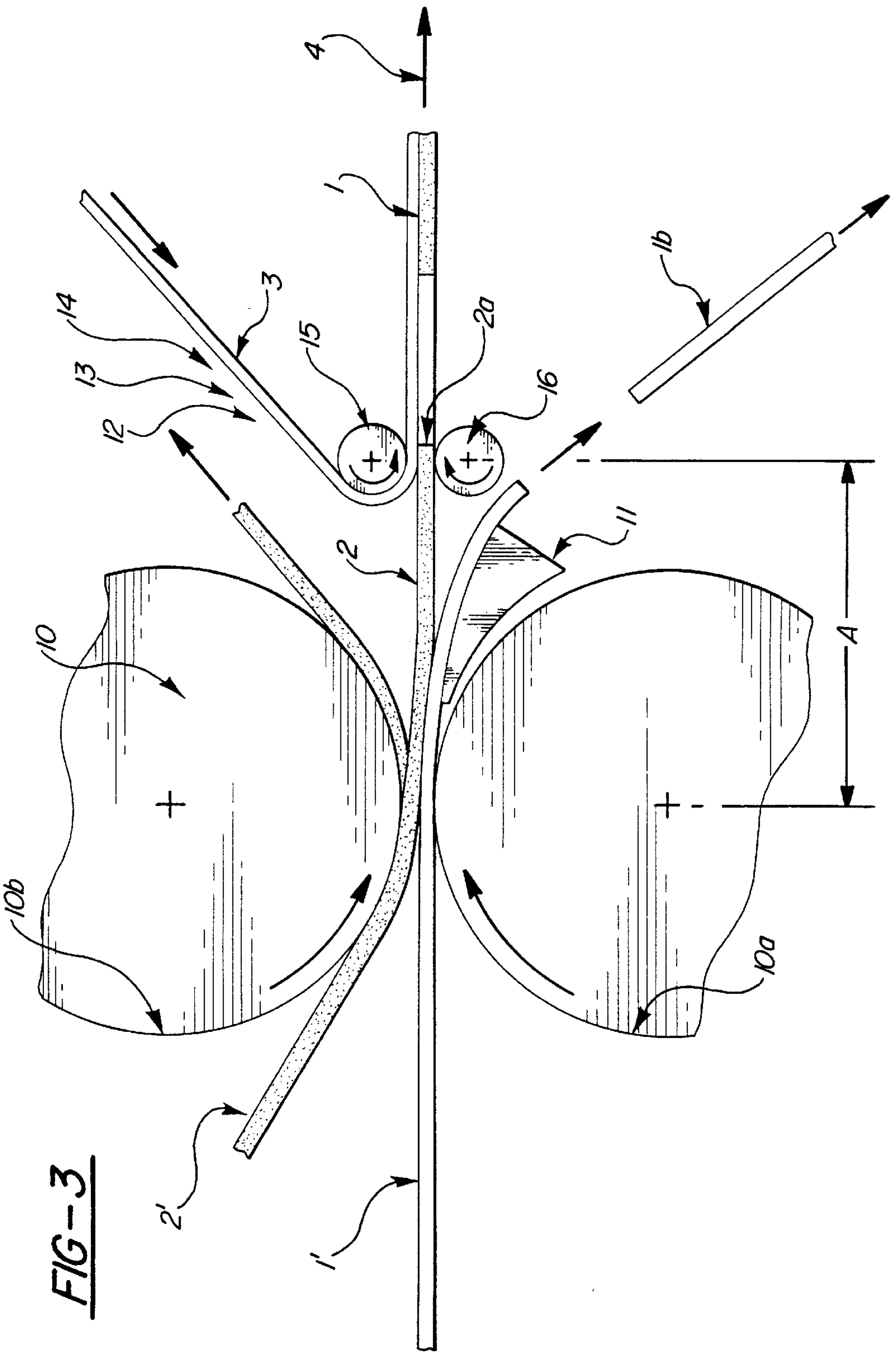
FIG. 3 shows a schematic side view of the apparatus for producing the card product.
Figure 4:
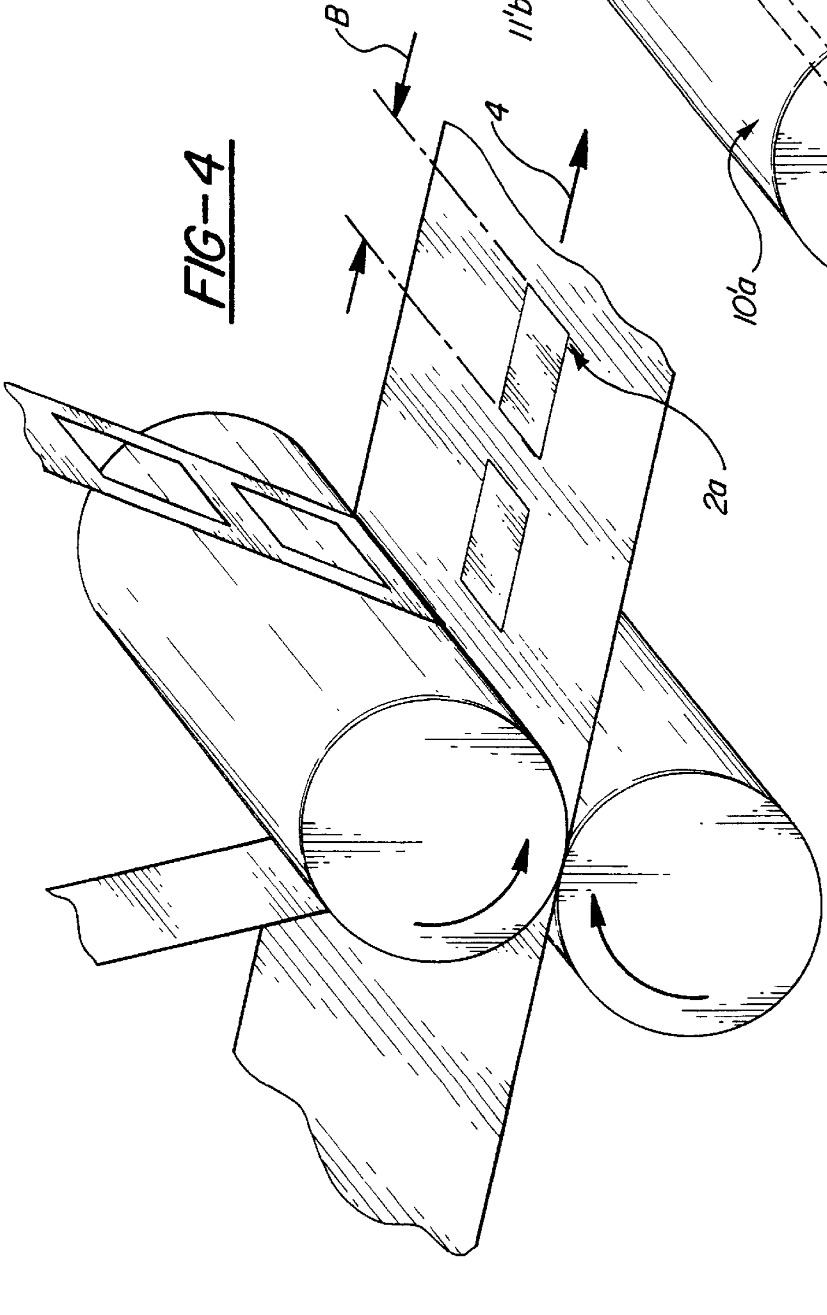
FIG. 4 shows a perspective partial view of the apparatus according to FIG. 3
Figure 5:
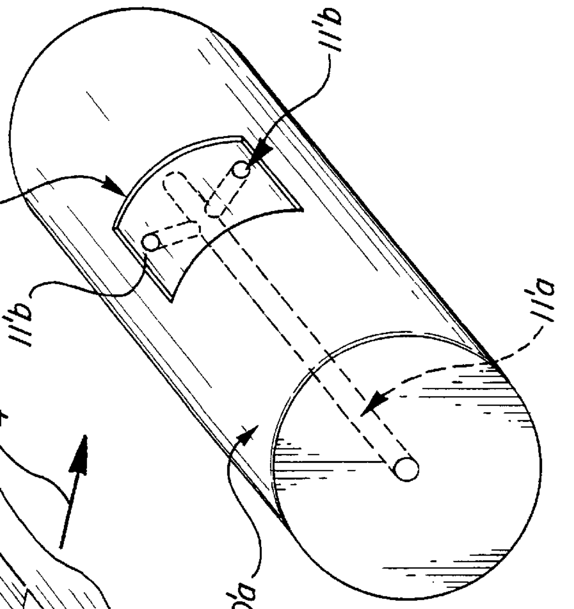
FIG. 5 shows a perspective view of the cutting cylinder according to a second embodiment.

The manufacture of this card product is described in greater detail below with reference to FIGS. 3 to 5.

The method for manufacturing the card product essentially comprises the following method steps:

a) a first material web 1' for producing the sheet 1 and a second material web 2' for producing the card 2 are delivered, lying one above the other, to a die cutting arrangement 10;

b) the first and second material webs 1', 2' are simultaneously cut, a segment 1*b* corresponding to the size of the cut-out 1*a* being cut out of the first material web 1' and the card 2 being cut out of the second material web 2', c) the segment 1*b* of the first material web 1' is removed, whilst the card 2 of the second material web 2' is inserted into the resulting cut-out 1*a*, d) the card 2 and the first material web 1' are fixed in position relative to one another by application of the adhesive strip 3, and the application of the adhesive strip 3 already begins before the card 2 or segment 1*b* is completely cut out.

Thus the apparatus for carrying out this method essentially comprises a) a die cutting arrangement 10 for simultaneous cutting of the first and second material webs 1', 2', b) an arrangement 11 for removing the cut-out segment 1*b* of the first material web 1', c) an arrangement 12 for introducing the card 2 into the cut-out, d) means 13 for temporarily fixing the first material web 1' and the card 2 in position relative to one another—before complete cutting out, and e) means 14 for applying the adhesive strip 3.

The die cutting arrangement 10 is formed by a cutting cylinder 10*a* and a first anvil element 10*b*. The anvil element 10*b* is constructed in the present case as an anvil cylinder. The cutting cylinder 10*a* has disposed on its circumference a cutting tool or blade 10*c* which corresponds to the shape of the cut-out or of the card. Depending upon the design of the card product, a plurality of such blades can also be disposed behind one another or beside one another on the cutting cylinder 10.

The arrangement 11 for removing the cut-out segment is formed for example by a vacuum arrangement which is disposed approximately like a wedge between the cutting cylinder and the first material web 1' in such a way that the cut-out segment 1*b* is drawn on by suction and led away downwards. Such a vacuum device is shown schematically in FIG. 3.

In a preferred embodiment according to FIG. 5 this vacuum arrangement is integrated directly in the cutting cylinder 10'*a*, wherein for example a suction pipe 11'*a* with one or more outlets 11'*b* opens in the region of the blade 10*c* so that the cut-out segment 1*b* is drawn on by suction through the outlets 11'*b* and at a later stage, for example after a half turn of the cutting cylinder 10'*a*, is pushed off by a pressure surge.

An electrostatic arrangement for removing the cut-out segment 1*b* is also conceivable within the scope of the invention.

After removal of the segment 1*b* the cut-out 1*a* results in the first material web 1'. The arrangement 12 for introducing the card 2 into this cut-out 1*a* is formed by two rolls 15, 16. Whilst the first material web 1' is essentially guided in a plane through this apparatus, before the die cutting arrangement 10 the second material web 2' runs obliquely towards the first material web 1' and after the die cutting arrangement it is led off obliquely upwards. The area of the card 2 which has already been cut out of the second material web 2' detaches itself from the material web 2' and attempts essentially to maintain the direction of the second material web 2' before the die cutting arrangement. In this way the front end 2*a* of the card 2 together with the material web 1' proceeds between the two rolls 15, 16, the card 2 being pressed into the cut-out 1*a* of the first material web 1'.

The means 13 for fixing the first material web 1' and the card 2 in position relative to one another are likewise formed by the two rolls 15, 16. For this the distance A between the cutting roll 10*a* and the two rolls 15, 16 is smaller than the extent B (see FIG. 4) of the card 2 in the transport direction 4 of the first material web 1'. The two rolls 15, 16 extend transversely with respect to the transport direction 4 to such an extent that they pick up both the card and also at least one adjoining portion of the first material web 1' and thereby fix the card 2 relative to the first material web 1'. Since the distance A is smaller than the extent B of the card 2, the front end 2*a* of the card 2 is already located between the rolls 15, 16 before the rear end 2*b* is cut out.

Moreover, the two rolls 15, 16 also form the arrangement 14 for applying the adhesive strip 3. The roll 15 is therefore constructed as a laminating roll and the roll 16 as a counter-pressure element or counter-pressure roll. The adhesive strip 3 is led from a corresponding magazine around the laminating roll 15 and applied directly onto the material web 1' or the card 2. In so far as the card 2 and the first material web 1' are held together by two adhesive strips 3, as shown in FIG. 1, two adhesive strips 3 which are spaced from one another are correspondingly delivered in the region of the rolls 15, 16.

The two material webs 1', 2' are advantageously delivered in continuous form. After the introduction and fixing of the card with the adhesive strip the resulting card product can be for example rolled, fan-folded or cut into individual sheets. The sheet 1 of the resulting card product can therefore be formed by an individual sheet, a portion of a continuous web or by the continuous web itself.

If more than one card 2 is to be inserted into the material web 1' transversely with respect to the transport direction 4 of the first material web 1', then a correspondingly wide second material web 2' or individual material webs corresponding to the number of cards would have to be delivered to the die cutting arrangement.

The remainder of the second material web 2' which is left after the card 2 has been cut out is a waste product which can optionally be recycled. Since this second material web 2' is frequently the substantially expensive material, the apparatus could advantageously have a control means by which the second material web 2' is stopped after cutting out of a card until a cut-out is again to be cut in the first material web 1'. Thus the second material web 2' is stopped between two cards to be cut out, whilst the first material web travels on. In this way the waste material of the second material web 2' can be markedly reduced. Naturally, a width can be used for the second material web 2' which is smaller than the width of the first material web 1'.

The card product produced using this method comprises the sheet 1 which is produced from the first material web 1' and has the cut-out 1*a* which has a specific width and length, as well as the card 2 which is produced from the second material web 2' and is disposed in the cut-out 1*a* of the sheet 1, wherein the sheet 1 and the card 2 are held together by at least one adhesive strip 3 coated on one side with a contact adhesive and wherein the card 2 and the cut-out 1*a* have exactly the same lengths and widths due to simultaneous cutting out with a cutting tool.

The card product can be manufactured particularly economically with the method described above or the apparatus for carrying out the method, since the apparatus can operate absolutely precisely whilst being of the simplest construction The movable parts of this apparatus are essentially formed only by the the cutting cylinder 10*a*, the anvil cylinder 10*b* and the two rolls 15, 16. Moreover, this simple construction facilitates very high processing speeds; thus the first material web 1' can be guided through the apparatus at speeds up 50 m/min or more. This leads to a production of approximately 500 products per minute, or 30,000 per hour.

What is claimed is:

1. Method of producing a card product comprising a sheet (1) with at least one cut-out (1*a*), and a card (2) which is disposed in the cut-out of the sheet, wherein the sheet (1) and the card (2) are held together by at least one adhesive strip (3) which is coated on one side with contact adhesive, with the following method steps:

a) a first material web (1') for producing the sheet (1) and a second material web (2') for producing the card (2) are delivered, lying one above the other, to a die cutting arrangement (10);

b) the first and second material webs (1', 2') are simultaneously cut, a segment (1*b*) corresponding to the size of the cut-out (1*a*) being cut out of the first material web (1') and the card (2) being cut out of the second material web (2'), c) the segment (1*b*) of the first material web (1') is removed, whilst the card (2) of the second material web (2') is inserted into the resulting cut-out (1*a*), d) the card (2) and first material web (1') are fixed in position relative to one another by application of the adhesive strip (3), and the application of the adhesive strip (3) already begins before the card (2) or segment (1*b*) is completely cut out.

2. Method according to claim 1, wherein the second material web (2') is stopped between two cards to be cut out, whilst the first material web (1') travels on.

3. Method according to claim 1, characterised in that a width is used for the second material web (2') which is smaller than the width of the first material web (1').

* * * * *